United States Patent
Carver et al.

(10) Patent No.: US 11,493,367 B2
(45) Date of Patent: Nov. 8, 2022

(54) DISTRIBUTED FIBRE OPTIC SENSING

(71) Applicant: Optasense Holdings Limited, Farnborough (GB)

(72) Inventors: Sara Carver, Farnborough (GB); Andrew Weld, Farnborough (GB)

(73) Assignee: Optasense Holdings Limited, Hampshire (GB)

( * ) Notice: Subject to any disclaimer, the term of this patent is extended or adjusted under 35 U.S.C. 154(b) by 38 days.

(21) Appl. No.: 17/260,839

(22) PCT Filed: Jul. 11, 2019

(86) PCT No.: PCT/GB2019/051945
§ 371 (c)(1),
(2) Date: Jan. 15, 2021

(87) PCT Pub. No.: WO2020/016556
PCT Pub. Date: Jan. 23, 2020

(65) Prior Publication Data
US 2021/0270643 A1    Sep. 2, 2021

(30) Foreign Application Priority Data

Jul. 16, 2018 (GB) ...................................... 1811640

(51) Int. Cl.
*G01D 5/353* (2006.01)
*G01H 9/00* (2006.01)
*G01K 11/32* (2021.01)

(52) U.S. Cl.
CPC ..... *G01D 5/35361* (2013.01); *G01D 5/35358* (2013.01); *G01H 9/004* (2013.01); *G01K 11/32* (2013.01)

(58) Field of Classification Search
CPC ........... G01D 5/35361; G01D 5/35358; G01H 9/004; G01K 11/32
See application file for complete search history.

(56) References Cited

U.S. PATENT DOCUMENTS

2009/0091765 A1    4/2009   Chow et al.
2010/0302549 A1*   12/2010  Menezo ............ G01B 9/02028
                                                      356/478
(Continued)

FOREIGN PATENT DOCUMENTS

WO    2015/165924    11/2015
WO    2017/037453     3/2017

OTHER PUBLICATIONS

Intellectual Property Office, Search Report dated Jan. 22, 2019, issued in connection with United Kingdom Patent Application No. GB1811640.0, 3 pages.
(Continued)

*Primary Examiner* — Dominic J Bologna
(74) *Attorney, Agent, or Firm* — McDonnell Boehnen Hulbert & Berghoff LLP

(57) ABSTRACT

This application described methods and apparatus for distributed fibre optic sensing. A sensing apparatus has a modulator which modulates radiation from an optical source to interrogate a sensing optical fibre with a first interrogation pulse at a first frequency (F1) and a second interrogation pulse at a second, different, frequency (F2), both different in frequency from a local oscillator (LO). A mixer mixes backscatter from the sensing optical fibre with the local oscillator and supplies the mixed signal to a detector that provides a corresponding digital signal. A processor processes the digital signal (DX, DY) in a first and second processing channels to demodulate respective first and second phase signals based on the respective frequency difference between the first and second frequency and the local oscillator and determines a temporal difference between the first and second phase signals.

19 Claims, 3 Drawing Sheets

(56) References Cited

U.S. PATENT DOCUMENTS

2015/0114127 A1\* 4/2015 Barfoot .................. G01H 9/004
                         73/655
2017/0350734 A1\* 12/2017 Ji ....................... G01D 5/35306
2018/0188077 A1\* 7/2018 Ronnekleiv ............ G01D 5/268

OTHER PUBLICATIONS

International Searching Authority, International Search Report and Written Opinion dated Oct. 7, 2019, issued in connection with International Patent Application No. PCT/GB2019/059145, filed on Jul. 11, 2019, 14 pages.

\* cited by examiner

DISTRIBUTED FIBRE OPTIC SENSING

CROSS-REFERENCE TO RELATED APPLICATIONS

The present application is a national stage entry of PCT/GB2019/051945 filed Jul. 11, 2019, which claims priority to GB 1811640.0 filed on Jul. 16, 2018, the contents of each of which are hereby incorporated by reference.

FIELD OF THE INVENTION

This application relates to methods and apparatus for distributed fibre optic sensing and especially to Rayleigh backscatter based distributed fibre optic sensing.

BACKGROUND OF THE INVENTION

Distributed fibre optic sensing is a known type of sensing where an optical fibre is deployed as a sensing fibre and interrogated with electromagnetic radiation to provide sensing of environmental stimuli affecting the sensing fibre along its length. By analysing the radiation backscattered from within the sensing fibre, the sensing fibre can effectively be divided into a plurality of discrete sensing portions which may be (but do not have to be) contiguous.

One class of distributed fibre optic sensors is based on illuminating the sensing fibre with coherent illuminating radiation and detecting illuminating radiation which has been Rayleigh backscattered from inherent scattering sites within the sensing fibre, i.e. radiation which has been elastically backscattered at the same frequency as the interrogating radiation. Within each discrete sensing portion of the sensing fibre, mechanical disturbances of the fibre, for instance, dynamic strains due to incident acoustic waves, cause a variation in effective optical path length of that section, which results in a variation in the properties of the radiation which is backscattered. This variation can be detected and analysed and used to give an indication of disturbance of the fibre at that sensing portion. Such a fibre optic sensor effectively acts as a linear sensing array of sensing portions of optical fibre which are responsive to disturbances such as acoustic stimuli, and thus such sensing is often referred to as distributed acoustic sensing (DAS), although the same principles can be applied to detect any stimulus that results in a variation in effective optical path length of the sensing fibre, such as temperature variations.

In one form of a Rayleigh backscatter based DAS system, the sensing fibre is repeatedly interrogated, with each interrogation involving launching a single continuous pulse of interrogating radiation into a first end of the sensing fibre and detecting the backscatter from the pulse. As the pulse propagates along the sensing fibre, different portions of the fibre are effectively illuminated by the propagating pulse at different times and there will be at least some backscatter due to inherent scattering sites within the optical fibre. The received backscatter may be analysed in different times bins based on the time after launch of the pulse to provide the different channels of the distributed fibre optic sensor corresponding to sensing portions of the sensing fibre.

The backscatter arriving back at the first end of the sensing fibre at any time will include contributions of backscatter from various different scattering sites from a portion of fibre illuminated by the pulse. As the interrogating radiation is coherent, the backscatter from the different scattering sites will interfere to provide an overall interference signal. The intensity of this backscatter interference signal will depend upon the extent to which the various contributions from the different scattering sites constructively or destructively interfere, which depends on the distribution of the inherent scattering sites within the fibre, which will vary effectively randomly along the length of the fibre. Thus the backscatter intensity from any given interrogating pulse will exhibit a random variation from one sensing channel to the next but, in the absence of any environmental stimulus, the backscatter intensity from any given sensing channel should remain the same for each repeated interrogation (provided the characteristics of the interrogating pulse remains the same). However a stimulus acting on the relevant sensing portion of the fibre can result in an optical path length change for that section of fibre, e.g. through stretching/compression of the relevant section of fibre and/or a refractive index modulation. A change in optical path length will vary the distribution of the scattering sites within the sensing portion and hence vary the degree of interference of all the individual scatter signals and thus result in a change in backscatter intensity of the overall interference signal. This change in intensity can be detected and used as an indication of a disturbance acting on the fibre, such as an incident acoustic wave.

Such a DAS system based on detecting an intensity variation of the backscatter can thus be used to detect a stimulus or disturbance acting on a sensing portion of the sensing fibre and can provide information regarding the time evolution of the stimulus, e.g. the acoustic frequency of the stimulus. However, whilst a certain type of stimulus may be expected to give rise to a detectable variation in backscatter intensity from a sensing portion, the amount of variation in backscatter intensity from each sensing portion in response to a given stimulus may vary, as the distribution in scattering sites within each sensing portion is effectively random. Thus it is not generally possible to determine any quantitative information about the amplitude of the stimulus acting on the sensing portion.

Nevertheless such a DAS system can advantageously be used in a number of applications and provides reliable sensing of stimuli acting on the sensing fibre. A relatively long length of sensing fibre may be monitored, so such a sensor may be particularly suitable for applications where sensing range is important, e.g. monitoring of borders, linear assets such as pipelines or the like or monitoring of transport networks such as railways.

In another type of DAS system, each interrogation of the sensing fibre may involve launching a pair of spatially separated pulses into the sensing fibre where there is a frequency difference between the pulses of the pair. Backscatter from the first pulse at the first frequency interferes with backscatter from the second pulse at the second frequency. This generates an interference signal which has a signal component at the difference frequency. In effect this results in a signal at a carrier frequency defined by the frequency difference between the pulses. The phase of the signal at the carrier frequency depends on the optical path length between the two pulses of the pair and thus, a disturbance that results in a change in effective optical path length between the pulses, for a given sensing portion of fibre, can be detected as a change in phase at that sensing portion. In such a DAS system a signal at the carrier frequency, defined by the frequency difference between the pulses, may be demodulated and processed to determine any change in phase indicative of a disturbance acting on the sensing portion. The extent of the change in phase is directly related to change in effective optical path length which in turn depends on the amplitude of the disturbance and hence this type of DAS sensor can provide quantitative information about a stimulus acting on the fibre.

Whilst such DAS sensors can provide useful quantitative information about stimuli acting on the fibre, the range of such sensors is relatively limited. The amount of backscatter received from a sensing fibre is generally quite low and, as will be understood by one skilled in the art, drops with increasing distance into the fibre. A certain proportion of the radiation reaching a given sensing portion may expected to be backscattered but the intensity of the interrogating radiation will decrease with distance into the fibre due to upstream scattering/absorption etc. and the backscatter will have a longer return path so a greater change of re-scattering/absorption etc. In simplistic terms in general the more photons of interrogating radiation launched into the sensing fibre, the more photons will be received as backscatter from a given sensing portion. However there is a limit to the intensity of radiation that can be launched into the fibre without causing non-linear effects which would generally be undesirable for DAS. Increasing the duration of the interrogating pulses does result in more photons for backscattering, but for the dual-pulse quantitative phase system discussed above it is generally desired that each pulse of the pulse pair has a limited spatial extent in the sensing fibre so the signal of interest arises from optical path length changes between the pulses. These factors means that the backscatter expected from a dual-pulse quantitative phase system is generally very weak and there is a limited range of sensing fibre that can be satisfactorily interrogated before the backscatter signal is so weak so as to be below the noise floor of the system.

SUMMARY OF THE INVENTION

Embodiments of the present disclosure relate to methods and apparatus for distributed fibre optic sensing, especially for fibre optic distributed acoustic sensing, that at least mitigate some of the issues noted above.

Thus according to an embodiment of the present disclosure there is provided a distributed fibre optic sensing apparatus, comprising an optical source, a local oscillator path configured to generate a local oscillator signal from the optical source and an optical modulator configured to, in use, modulate radiation from the optical source to provide a first interrogation pulse at a first frequency and a second interrogation pulse at a second, different, frequency in each of a plurality of repeated interrogation periods, where each of the first and second frequencies is different to the frequency of the local oscillator signal. A mixer is configured to receive a backscatter signal comprising radiation from the first and second interrogation pulses which is backscattered from within a sensing optical fibre and to mix the backscatter signal with the local oscillator signal to provide a first mixed signal. A detector arrangement is configured to receive the first mixed signal and provide a corresponding first digital signal. A processor is configured to process the first digital signal, wherein the processor is configured to: process the first digital signal in a first processing channel to demodulate a first phase signal based on a first carrier frequency corresponding to the frequency difference between the first frequency and the frequency of the local oscillator signal; process the first digital signal in a second processing channel to demodulate a second phase signal based on a second carrier frequency corresponding to the frequency difference between the second frequency and the frequency of the local oscillator signal; and determine a temporal difference between the first phase signal and the second phase signal.

Such a distributed fibre optic sensing apparatus can provide good sensing performance. The system can be used to provide quantitative outputs over a relatively long sensing range as will be described in more detail below.

In some instances the frequency difference between the first frequency and the second frequency may be at least 80 MHz. In some instances the frequency difference between the first frequency and the second frequency may be at least 100 MHz. In some implementations the first frequency and the second frequency may each differ from the frequency of the local oscillator signal by at least 200 MHz. For example the first launch frequency and the second launch frequency may each differ from the frequency of the local oscillator signal by a frequency difference in the range 200 MHz to 400 MHz. Other frequency differences may be implemented in some arrangements.

In some implementations the first and second phase signals may each comprise spatial-differential phase signals indicative of a differential change in phase over a defined gauge length of the sensing optical fibre at each of a plurality of locations along the sensing optical fibre as determined from the first and second interrogation pulses respectively.

In some implementations the processor may be further configured to integrate the determined temporal difference between the first phase signal and the second phase signal over time with a scaling factor based on the time delay between the first and second interrogation pulses as a fraction of the interrogation period to provide a scaled phase signal. The processor may be further configured to output a measurement signal based on the scaled phase signal.

In some examples the processor is configured such that the processing of the first digital signal comprises: down-converting and subsequently low-pass filtering a version of the first digital signal based on the first carrier frequency to provide a first baseband signal in the first processing channel; and down-converting and subsequently low-pass filtering a version of the first digital signal based on the second carrier frequency to provide a second baseband signal the second processing channel. The processor may be configured such that the low-pass filtering has a cut-off frequency of 40 MHz or higher. The detector arrangement may be configured such that the first digital signal has a sample rate which is at least twice the frequency of the higher of the first carrier frequency and the second carrier frequency. In which case the processor may be configured to process the first and second baseband signals in the respective first and second processing channels to reduce the sample rate. In some implementations processing the first and second baseband signals may further comprise summing each of the first and second baseband signals over a distance corresponding to half a length of the first and second interrogation pulses in the sensing optical fibre.

Processing of the first digital signal may, in some instances, comprise, for each of the first and second processing channels, determining a value of phase angle of a phasor of the respective first or second baseband signal for each of a plurality of locations along the sensing optical fibre. The processor may be configured such that the processing of the first digital signal comprises, for each of the first and second processing channels, generating the respective first or second phase signals by determining a differential change in said phase angle over a defined gauge length of the sensing optical fibre at each of a plurality of locations along the sensing optical fibre.

In some implementations the mixer may be further configured to mix the backscatter signal with the local oscillator signal in a different polarisation state to provide a second mixed signal. The detector arrangement may also be configured to receive the second mixed signal and provide a corresponding second digital signal; and the processor may be configured to process the second digital signal in the same way as the first digital signal. The processor may be configured to combine data generated from processing the first digital signal and data generated from processing the first digital signal according to a quality metric.

The optical modulator may comprise at least one acousto-optic modulator. In some embodiments the optical modulator may comprise at least one optical switch.

Embodiments also relate to a distributed fibre optic sensing apparatus as described in any of the variants herein and further comprising a sensing optical fibre coupled to receive the interrogating pulses from the optical modulator and to provide the backscatter signal to the mixer.

Embodiments also relate to a method of distributed fibre optic sensing comprising: generating a local oscillator signal; repeatedly interrogating a sensing optical fibre with optical radiation, wherein each interrogation comprises, over an interrogation period, launching a first interrogation pulse at a first frequency and a second interrogation pulse at a second, different, frequency into the sensing optical fibre, wherein the each of the first and second frequencies is different to the frequency of the local oscillator signal; receiving a backscatter signal from the sensing optical fibre; mixing the backscatter signal with the local oscillator signal to provide a first mixed signal; and generating a first digital signal corresponding to the first mixed signal. The method also comprises processing the first digital signal in a first processing channel to demodulate a first phase signal based on a first carrier frequency corresponding to the frequency difference between the first frequency and the frequency of the local oscillator signal; processing the first digital signal in a second processing channel to demodulate a second phase signal based on a second carrier frequency corresponding to the frequency difference between the second frequency and the frequency of the local oscillator signal; and determining a temporal difference between the first phase signal and the second phase signal.

The method according to this aspect may be implemented in any of the variants discussed with reference to the distributed fibre optic sensing apparatus.

DESCRIPTION OF THE DRAWINGS

Embodiments, and feature of embodiments of the present disclosure, will now be described by way of example only with respect to the accompanying drawings, of which.

DESCRIPTION OF THE INVENTION

Embodiments of the present disclosure relate to methods and apparatus for distributed fibre optic sensing, and in particular to Rayleigh backscatter based distributed fibre optic sensing that can provide quantitative data about stimuli affecting a sensing fibre and which can operate over relatively long sensing ranges.

Figure 1:
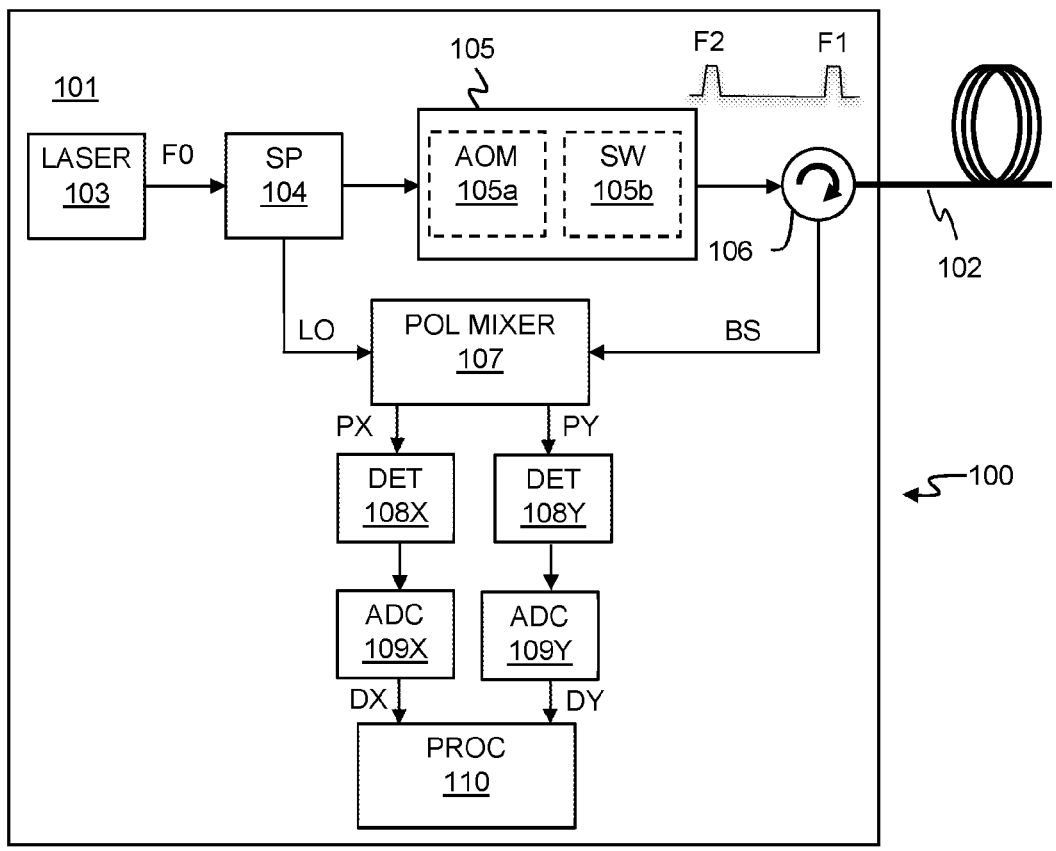
FIG. 1 illustrates an example of a distributed fibre optic sensor system according to an embodiment.

FIG. 1 illustrates one example of a distributed fibre optic sensor system 100 suitable for distributed acoustic sensing (DAS) according to one embodiment. The DAS system 100 includes an interrogator unit 101 for interrogating a sensing optical fibre 102. In use the sensing optical fibre 102 may be removably connected to the interrogator unit 101, either directly or via some intermediate optical connection such as an intermediate length of optical fibre (not shown in FIG. 1).

The sensing optical fibre 102 may be an optical fibre such as would routinely be used for telecommunication applications, e.g. some conventional single mode optical fibre. The sensing optical fibre 102 may be substantially unmodified and thus may be substantially free of any deliberately introduced reflection or scattering sites such as fibre Bragg gratings (FBGs) or the like, at least over a significant length of the sensing optical fibre which is used for sensing. In some applications however the sensing optical fibre may be an optical fibre of a fibre optic cable structure that has been specifically designed to be responsive to certain stimuli or to have a tuned sensitivity response, e.g. to improve the sensitivity to at least some acoustic signals.

In use the sensing optical fibre 102 may be deployed in an area or location of interest which it is wished to monitor. In some applications the sensing optical fibre 102 may be deployed in a location of interest a relatively permanent manner, for instance at least part of the sensing optical fibre 102 may be buried in the ground in a defined pattern in an area or to follow a defined path. Additionally or alternatively at least part of the sensing optical fibre 102 could be embedded in a structure.

The interrogator unit 101 is configured to, in use, repeatedly interrogate the sensing optical fibre 102 with interrogating radiation. In embodiments of the disclosure each interrogation involves launching at least one interrogating pulse, and advantageously at least two temporally separated pulses, into the sensing optical fibre and receiving optical backscatter from the sensing optical fibre following the pulse launch. In embodiments of the disclosure the received backscatter signal is mixed with a local oscillator signal, where there is a controlled frequency difference between the frequency of an interrogating pulse and the frequency of the local oscillator.

FIG. 1 thus illustrates that the interrogator unit 101 has an optical source, in this case a laser 103, to generate an optical signal at a source frequency F0. The output from the laser 103 is received by a beam splitter 104 that splits the laser output into an output path and also a local oscillator path to provide a local oscillator signal LO. The signal in the output path is input to a modulator 105 which modulates the laser output to provide defined interrogating pulses of optical radiation. In this example the modulator 105 is configured to impart a frequency shift to each interrogating pulse from the source frequency F0 of the local oscillator signal. The modulator 105 may comprise at least one acousto-optic modulator (AOM) 105a for imparting a frequency shift to the radiation in the output path, which is gated, so as to form the interrogating pulses. The modulator 105 may thus comprise one or more elements, such as AOM 105a, for providing a frequency shift. In some embodiments at least some of the elements used to provide a frequency shift may also be used to define the pulses of the interrogating radiation, e.g. to define the start and end of the pulse. In some instances however one or more components such as an AOM 105a may be used to impart frequency shifting and there may be at least one additional component, such as an optical switch 105b for example, to provide gating to define the interrogating pulses, e.g. to define the start and end of the pulse.

In some embodiments there may be more than one AOM 105a, for instance a first AOM could be arranged to provide a first frequency shift, with at least a second AOM arranged to provide a second frequency shift, which could be a shift in the same direction or opposite direction as the first frequency shift, so as to provide an overall desired frequency shift. For instance in some embodiments a first AOM could provide a first frequency shift, which may provide the majority of desired frequency shift. The frequency shifted signal may be amplified, which may add some amplified spontaneous emission (ASE) noise, which may be undesirable, especially when interrogating long fibres. A second AOM, e.g. an AOM with a low insertion loss, may in some embodiments, be usefully be used to block at least some of the ASE noise and may provide a second frequency shift, with the first and second frequency shifts collectively providing the overall desired frequency shift. In one example a first AOM may provide a frequency upshift of a few hundred MHz and a second AOM with a low insertion loss may provide a frequency downshift of a few tens of MHz.

It will of course be appreciated that at least some of the frequency shift between the launched interrogating radiation and the local oscillator LO could additionally or alternatively be introduced by a frequency shift applied by a modulator in the local oscillator path.

The frequency shift introduced between the local oscillator LO and an interrogating pulse is chosen to provide a measurable carrier signal at a desired frequency when the backscatter signal BS is mixed with the LO signal. In some embodiments the frequency difference imparted to an interrogating pulse may be in the range of about 200 MHz to 400 MHz.

In the embodiment of FIG. 1 the modulator 105 is configured to repeatedly generate a first pulse at a first frequency F1 and at least a second temporally separated pulse at a second frequency F2, different to the first frequency F1. In other words each interrogation of the sensing optical fibre 102 can be seen as comprising a first pulse at frequency F1 followed later by the second pulse at frequency F2.

The difference between the first frequency F1 and the second frequency F2 is selected to be sufficiently large so as to allow the backscatter from each individual interrogating pulse to be demodulated independently and with an acceptable bandwidth, as will be described in more detail later. For example in some embodiments the frequency difference between the first and second interrogating pulses, i.e. between frequencies F1 and F2, may be at least 80 MHz and may, for example, be of the order of about 100 MHz.

Thus, for example, the modulator 105 may be configured to produce a first interrogating pulse at a frequency F1 having a frequency shift from the local oscillator signal LO of the order of 250 MHz and a second interrogating pulse at a frequency F2 having a frequency shift from the local oscillator signal LO of the order of 350 MHz.

The repetition rate of interrogations of the optical fibre, sometimes referred to as the ping-rate, is set with regard to the maximum expected round trip-travel time in the sensing optical fibre, so as to allow time for radiation of a pulse of one frequency, for example the first frequency F1, to travel to the maximum sensing extent of the sensing optical fibre and back again before another pulse of the same frequency, e.g. F1, is launched into the sensing optical fibre. The maximum sensing extent may be the distal end of the sensing optical fibre or a distance into the sensing optical fibre beyond which no significant backscatter would be expected back at the proximal end of the fibre connected to the interrogator unit 101. This limitation on the ping-rate ensures that any radiation at a given frequency, F1 or F2, received at the detector can only have originated from a given interrogating pulse. Were pulses of the same frequency launched into the sensing optical fibre more frequently than this, it would not be possible to determine whether radiation at frequency F1 reaching the detector had been backscattered from a recently launched interrogating pulse from a short distance into the fibre or from an earlier interrogating pulse from further into the fibre.

Thus, for example, for a sensing optical fibre of 25 km in length, the maximum round trip travel distance within the sensing optical fibre is 50 km. Assuming a refractive index for the sensing fibre of n=1.5, the round trip travel time would be expected to be about 0.25 ms. Thus the maximum that the ping rate could be would be 4 kHz.

Were each interrogation to involve a single interrogation pulse only, or a pair of pulses where the measurement signal of interest is due to interference between the pulses, then this ping-rate limitation would limit to maximum sampling rate of the sensing optical fibre. This limitation on the sampling rate can be disadvantageous in limiting the maximum frequency of signals that can be detected and/or in limiting the dynamic range of a quantitative phase based sensor. As will understood by one skilled in the art, large amplitude signals cannot be tracked accurately when the acoustic amplitude results in a phase change that exceeds $\pi$ radians between sample intervals. The greater the time between sample intervals the lower the rate of change of the stimuli, i.e. the frequency-amplitude product of a stimulus, that can be monitored accurately without signal wrapping.

In embodiments of the present disclosure the measurement signals of interest are the carrier signals due to interference of the backscatter from one interrogating pulse and the local oscillator. Thus the DAS system is designed such that each interrogating pulse results in a separate carrier signal of interest when mixed with the local oscillator. As noted above the first and second interrogating pulses have a frequency difference which is sufficient such that these first and second carrier signals can be independently demodulated. Thus the first and second interrogating pulses allow for sub-sample measurements and can improve the dynamic range of DAS sensor. It will of course be understood that this principle could be extended to provide more than two independent carrier signals provided that the carrier signals can be independently demodulated.

This is quite different to the previously known pulse-pair interrogation technique described earlier, in which the carrier signal of interest is due to interference of the backscatter from the two pulses in the pair. In such a system the backscatter from both pulses must be processed together and thus the backscatter from pulse pair provide a single sample of the DAS sensor for each channel. In such a sensor the time separation between the pulses in the pair defines the gauge length of the sensor, i.e. the minimum spatial resolution of the sensor. The delay between the pulses is thus typically very short to define an acceptable gauge length, say of the order of 100 ns or less to provide a gauge length of about 10 m or less.

In embodiments of the present disclosure the first and second interrogating pulses are used to provide separate sub-samples of any phase change. The delay between the first interrogating pulse and the second interrogating pulse may thus be selected to provide any sub-sample period. As will be described in more detail below the extent of any phase change between the first and second interrogation pulses can be used to provide an indication of the rate of change of phase and hence amplitude. The delay period may be chosen based on a desired maximum amplitude such that a signal at that desired maximum amplitude will not have changed by more than π radians in the sub-sample period. The interrogation period, P, between repeatedly launches of a pulse of the same frequency (i.e. 1/ping-rate) may be set as described above based on the maximum round-trip travel time, e.g. 0.25 ms in the example for a 25 km sensing optical fibre. The delay between the first and second interrogating pulses may be any desired fraction of this interrogation period, P.

The first and second interrogating pulses are launched into the sensing optical fibre 102 via circulator 106 and the backscatter signal BS received back from the sensing optical fibre 102 is directed by circulator 102 to mixer 107 where it is mixed with the local oscillator signal LO.

Mixing the backscatter signal BS with the local oscillator signal LO will generate a carrier signal component at the frequency difference between the frequency of the relevant interrogating pulse, i.e. F1 or F2, and the frequency of the local oscillator signal, i.e. F0. This will result in a first carrier signal at the frequency difference between the first interrogating pulse and the local oscillator, i.e. |F1−F0|, e.g. 250 MHz in the example discussed above, and a second carrier signal at the frequency difference between the second interrogating pulse and the local oscillator, i.e. |F2−F0|, e.g. 350 MHz in the example discussed above.

It will be appreciated that the mixing of the backscatter signal and local oscillator signal in this way to produce the carrier signal in effect provides amplification of the signal component of interest from the backscatter signal in the resultant mixed signal. It will be understood that there will also be a backscatter signal component that does result from interference between the backscatter from the two interrogating pulses, i.e. a signal component at a frequency of |F1−F2|. Such a signal component will be relatively weak however and the local-oscillator scaling amplification means that the carrier signal due to the interference of each pulse with the local oscillator signal LO will dominate.

It will be understood that the backscatter signal component arising from a given one of the interrogating pulses will result from radiation that will have traveled a certain distance into the sensing optical fibre, before being scattered, and then will have traveled back to the start of the fibre. This round trip propagation within the fibre may have imparted a change in polarisation state of the radiation, compared to the polarisation state of the local oscillator signal LO. The polarisation state of a component of the backscatter signal BS may therefore change over time as the backscatter component is received from different distances into the fibre. It will be appreciated that if the backscatter signal component from one of the interrogating pulses were, at any time, to be in a polarisation state that is orthogonal to that of the local oscillator signal LO, then no signal mixing would occur between that backscatter component and the local oscillator signal at that time and the relevant carrier signal would be in a polarisation faded state. To avoid this fading problem the mixer 107 may be a dual-polarisation mixer which mixes the local oscillator signal LO and backscatter signal BS in two different polarisation states. For example the dual-polarisation mixer 107 may receive the local oscillator signal LO and derive two versions of the local oscillator signal at different polarisations, e.g. orthogonal polarisation states X and Y, which are then each mixed separately with the received backscatter signal BS to provide two mixed signals PX and PY. If a particular component of the backscatter signal BS has a polarisation state such that the relevant carrier signal is in a faded state in one mixed signal, e.g. PX, the relevant component will mix with the local oscillator signal in the other polarisation state and so the relevant carrier signal will not be a faded state in the other mixed signal, e.g. PY.

Figure 2:
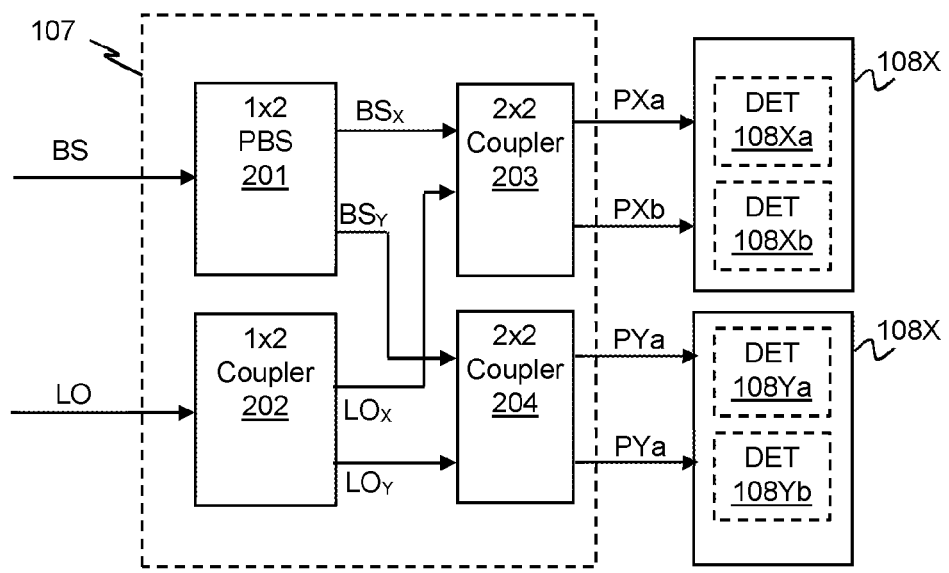
FIG. 2 illustrates one example of a suitable polarisation mixer and detector arrangement.

FIG. 2 illustrates one example of a suitable polarisation diversity detection arrangement, i.e. one example of a suitable arrangement for polarisation mixer 107. The polarisation mixer 107 has a first polarising beam-splitter 201 arranged to receive the backscatter signal BS and to split it into two components $BS_X$ and $BS_Y$ at first and second orthogonal polarisation respectively states. The local oscillator signal LO is also divided into components $LO_X$ and $LO_Y$ so as to be mixed with the respective backscatter components such that the polarisation of the local oscillator is aligned with that of the backscatter. In some implementations a 1-to-2 polarising maintaining coupler 202 may provide the local oscillator components $LO_X$ and $LO_Y$ which maintain the original polarisation state of the local oscillator signal and which are combined with the respective backscatter component in an aligned manner. In some implementations however the 1-to-2 coupler 202 could be implemented by a 45° beam-splitter which is configured to split the local oscillator signal into two orthogonal polarisation states which correspond to the first and second polarisation states. The backscatter signal at the first polarisation state, $BS_X$, is supplied to a coupler 203 to be mixed with the local oscillator signal component $LO_X$ at the first polarisation state. Likewise the backscatter signal at the second polarisation state, $BS_Y$, is supplied to a coupler 204 to be mixed with the local oscillator signal component $LO_Y$ at the second polarisation state $LO_Y$. Each of the orthogonal polarisation states of the detected backscatter is thus mixed with the local oscillator signal with an aligned polarisation state. Whatever the polarisation state of the backscatter signal there will be mixing between the backscatter signal and the local oscillator in at least one of the couplers 203 and 204.

In some implementations the respective mixed signals at the two polarisation states PX and PY may be supplied to respective detectors 108X and 108Y as illustrated in FIG. 1. However in some embodiments a balanced or differential detection scheme may be used to improve SNR. As illustrated in FIG. 2, for each polarisation state, a first mixed signal PXa or PYb may be produced which corresponds to the relevant backscatter signal mixed with the respective LO signal and also a second mixed signal PXa or PYb may be produced which corresponds to the relevant backscatter signal mixed with the respective LO signal with a phase shift of π radians compared to the first mixed signal. This may be achieved through the use of 2×2 couplers 203 where the path between a first input and a first output experiences a phase shift of π/2 with respect to a path between the first input and a second output. Likewise a path between a second input and the second output may experience a phase shift of π/2 with respect to a path between the second input and the first output. The net result is equivalent to a phase shift of π in the LO in each of the mixed signals for a given polarisation state, e.g. PXa and PXb. Each of the mixed signals for a given polarisation state, e.g. PXa and PXb, may be received by separate detector elements, e.g. 108Xa and 108Xb. The resultant signal from the two detectors elements 108Xa and 108Xb can be subtracted. This has the result of doubling the signal of interest whilst reducing the unwanted intensity noise component which is common to both detectors.

This results in two channels corresponding to the two polarisation states of the backscatter signal mixed with the local oscillator.

The local oscillator path may thus be implemented so as to maintain the polarisation status of the LO output from the optical source 103. The local oscillator path may, for example, be at least partly implemented by polarisation maintaining fibre links between the splitter 104 and the detectors 108X and 108Y. Equally the paths for the backscatter signal from the polarising beam splitter 201 to the detectors (some of which will be the shared paths for the mixed backscatter/LO signal) should also maintain polarisation, e.g. be implemented using polarisation maintaining fibre.

Referring back to FIG. 1 the signals from respective detectors 108X and 108Y may be sampled at a relatively fast rate by respective ADCs 109X and 109Y. The resulting digital signals DX and DY are processed by processor 110.

Each digital signal DX and DY thus contains backscatter components from both the first and second interrogating pulses and thus, unless complete polarisation fading has occurred in that channel, will have signal components at the first and second carrier frequencies. The digital signals DX and DY for each polarisation channel may thus be processed in substantially the same way so as to provide data for each carrier signal for each polarisation channel. Data from each polarisation channel for each of the first and second carrier signals may then be combined using a polarisation diversity based processing scheme to overcome any fading in one of the polarisation channels and use the best available data from the two polarisation channels.

Figure 3:
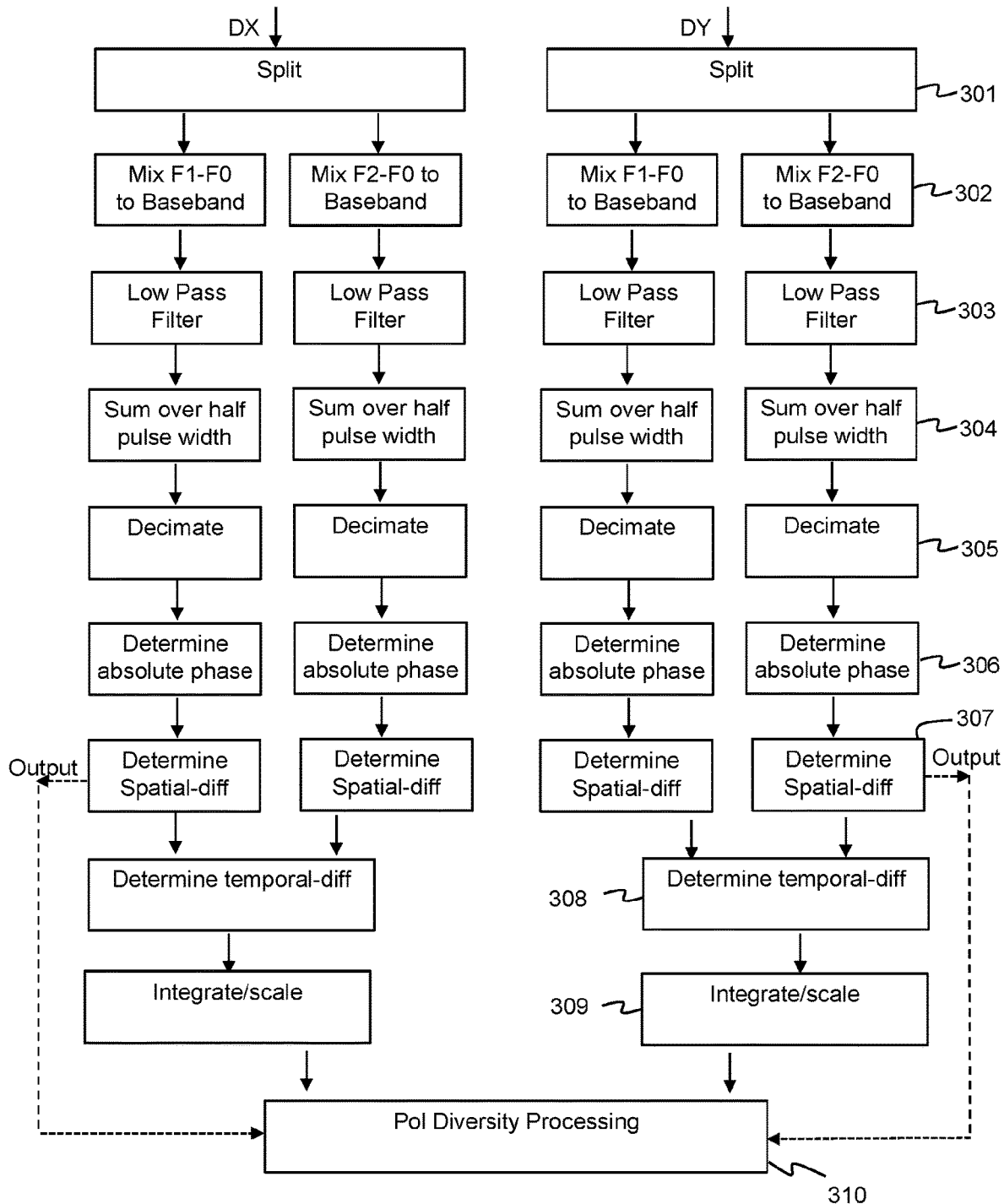
FIG. 3 illustrates one example of a processing flow for processing data from the distributed fibre optic sensor system.

Each digital signal, DX and DY, may therefore be processed in generally the same way. FIG. 3 illustrates generally one example of a suitable processing flow.

The digital data DX and DY is split (301) respectively into two data streams for the first and second carrier signals respectively. Each of the first and second data streams for each polarisation channel is then down-mixed (302) to baseband. The first data stream is then down-mixed to a baseband signal based on the frequency of the first carrier signal |F1−F0|, e.g. 250 MHz in the example discussed above. The second data stream is down-mixed to a baseband signal based on the frequency of the second carrier signal |F2−F0|, e.g. 350 MHz in the example discussed above. Each of the down-mixed baseband signals are then low-pass filtered (303), with a frequency cut-off so as to leave only the baseband signals corresponding to the first and second carrier signals respectively.

As discussed above the separation between the frequencies F1 and F2 of the first and second interrogations pulses is set to be high enough so that the two carrier signals can be independently demodulated and processed to provide a desired spatial resolution. A relatively high spatial resolution, say 0.5 m, would correspond to a pulse having a spatial length of 1 m in the sensing optical fibre. Such a pulse would have a period, t, of the order of 10 ns (for an optical fibre with a refractive index around n=1.5). The spectral frequency content of such a pulse is effectively 1/t, so the 0.5 m resolution corresponds to frequency content of about 100 MHz.

Thus a frequency separation of about 100 MHz between the first and second interrogation pulses would be sufficient frequency separation of the respective first and second carrier signals to enable the carrier signals to be independently demodulated and provide a 0.5 m spatial resolution.

Figure 4:
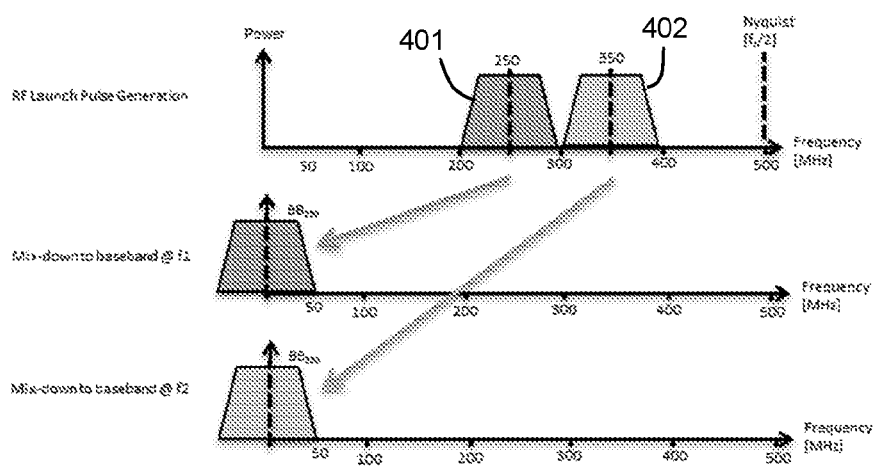
FIG. 4 illustrates the principle of two carrier signals independently down-mixed to baseband signals.

FIG. 4 illustrates this principle. The top plot of FIG. 3 illustrates the spectral power associated with the first carrier signal due to the first interrogating pulse 401 and the second carrier signal due to the second interrogating pulse 402. In this example the frequency of the first carrier signal is 250 MHz, with spectral content 250 MHz±50 MHz, and the frequency of the second carrier signal is 350 MHz, with spectral content 250 MHz±50 MHz. It can be seen that the relevant spectral content can be down-mixed to baseband and after down-mixing each baseband signal can be low-pass filtered with a cut-off frequency, in this example, of about 50 MHz to leave a baseband signal correspond just to the spectral content of the relevant carrier which is sufficient to provide the desired spatial resolution.

It will be understood that to preserve the relevant spectral content of the carrier signals the bandwidth of the detectors 108X and 108Y and sample rate of the ADCs 109X and 109Y must be sufficient for the highest expected signal content of interest. In this example the maximum frequency content of interest is at 400 MHz (i.e. 350 MHz+50 MHz) which thus requires a detector bandwidth of at least 400 MHz and an ADC sample rate of at least 800 MHz. In some implementations the ADCs 109X and 109Y may be implemented to sample at a rate of around 1 GHz to ensure the system has sufficient bandwidth. FIG. 4 thus illustrates that the Nyquist limit for the digital signals sampled by the ADCs may be of the order of 500 MHz.

Referring back to FIG. 3, the filtered data may be summed (304) over a distance corresponding to half the spatial length of the interrogating pulse in the sensing optical fibre, which corresponds to physical minimum spatial resolution of the data. As one skilled in the art will understand backscatter arriving at the detector at a first time from a first fibre location may be coincident with backscatter from within a certain length of the sensing optical fibre which was scattered at slightly different times.

Consider that some backscatter occurs from the leading edge of an interrogating pulse at a first location in the sensing optical fibre at a first time. Such backscatter will start propagating backwards. A short time later, at a second time, the backscatter will have reached a second location, closer to the start of the fibre. If the second location is still illuminated by the interrogating pulse at that time, then any backscatter from the second location at the second time will be coincident with the backscatter from the first location at the first time. This possibility of further coincident backscatter will continue until the backscatter from the first location reaches a part of the sensing optical fibre which is not illuminated by the interrogating pulse, i.e. until the backscatter from the first location passes the trailing edge of the interrogating pulse. As the pulse is propagating forward at the same velocity as the backscatter is propagating backwards this will occur when the backscatter that originated from the leading edge has propagated backwards for distance equal to half the length of the interrogating pulse and the pulse itself has propagated forward by a distance equal to half the interrogating pulse length. Thus the backscatter received at any instant, i.e. each sample of the ADC 109X or 109Y corresponds to combined backscatter from a section of the sensing optical fibre with a length equal to half the length of interrogating pulse in the sensing optical fibre, and this represent a physical limit on the spatial resolution.

The sample rate of the summed data may then be reduced (305) to reduce the downstream processing burden. Whilst a high sample rate for the ADCs is required for the carrier signals prior to down-conversion, however once the signals have been down-mixed to baseband the sample rate may be reduced. As the baseband signals have been filtered with a cut-off frequency of 50 MHz the sample rate may be reduced to a sample rate of 100 MHz.

The reduced sample rate data may then be processed to determine (306) the absolute angle of the complex baseband phasor, i.e. the phase between the local oscillator signal and the backscatter component from the relevant interrogating pulse. There are various ways in which the baseband signal may be processed to determine the absolute phase angle of the complex phasor as would be understood by one skilled in the art. In some embodiments the magnitude of the phasor may also be determined to be used as a quality metric in downstream processing, e.g. for selection of signals having the best magnitude.

This provides, for each carrier signal, an indication of absolute phase angle as a function of position along the fibre for a given interrogation, $\phi(z)$ (where z is distance along the sensing optical fibre).

A spatial-differential in phase $\delta\phi(z)$ over a defined gauge length L then is then calculated (307) along the length of the fibre, i.e. $\delta\phi(z)=\phi(z)-\phi(z-L)$ for each carrier signal channel. The defined gauge length L may be any desired gauge length that is greater than or equal to the maximum spatial resolution of the system, e.g. a minimum gauge length of 1 m for the example discussed above with a frequency separation between the first and second carriers of 100 MHz. Thus, for example, a defined gauge length L in the range of 1 m-50 m say may be selected depending on the particular use case at the time. The defined gauge length of the system according to embodiments of the disclosure is thus arbitrary and defined in processing and, if desired, a plurality of different gauge lengths could be processed in parallel. Using the spatial-differential of phase thus provides an indication of the change of phase over that spatial section of the sensing fibre and hence an indication of any stimuli acting on just that portion of the sensing fibre.

For each location along the length of the sensing optical fibre a temporal-differential in phase $\Delta\delta\phi(z, t)$ is determined (308) as difference between the spatial-differential in phase determined from the first carrier signal, for the first interrogation pulse as a time t1 and the spatial-differential in phase determined from the second carrier signal, for the second interrogation pulse as a later time t2, i.e. $\Delta\delta\phi(z, t)=\delta\phi(z, t1)-\delta\phi(z, t2)$.

This temporal-differential in phase $\Delta\delta\phi(z, t)$ provides an indication of the rate of change of the phase at a given location and hence an indication as to whether the amplitude of the phase change between subsequent interrogations is likely to exceed $\pi$ radians. In some instances the temporal-differential in phase may be output from the interrogator unit for downstream processing, for instance to indicate the possibility of overscale signals for one or more sensing channels of the DAS sensor.

In at least some embodiments however the temporal-differential in phase may be integrated over time and scaled (309) by the ratio if the delay between the first and second interrogating pulses $\Delta t$ to the interrogation period P, i.e. $\int(\Delta\delta\phi(z, t)/\Delta t)\cdot P=\delta\phi(x,t)$. This provides a differential phase signal that is scaled according to the change in phase that occurred between the two interrogation pulses.

This differential phase signal may be used to provide a recovered signal of interest. In at least some embodiments diversity processing (310) may be applied at this stage so as to select the best data for various sensing portions of the optical fibre, i.e. output channels of the distributed fibre optic sensing system, based on quality metrics applied to the data for the two polarisation diverse processing channels. The diversity processing may select data based on a best magnitude basis calculated based on an absolute magnitude of the phasor calculated at step 306 for the two different carrier signals for each polarisation channel. Additionally or alternatively at least some diversity processing may be applied at earlier stage of the process flow.

In this way the output of the output of processor 110 of the interrogator unit 101 can be used to provide a phase signal that can be used to provide a quantitative indication of an acoustic signal, or other disturbance leading to a variation in optical path length, acting on a sensing portion of the sensing optical fibre. The evolution of the phase signal over repeated interrogations at a suitable ping-rate can be used to provide tracking of the incident acoustic signal with the sub-sample interval provided by a second interrogation pulse delayed from a first interrogation pulse by a fraction of the interrogation period can be used to scale the phase signal appropriately to accurately track large amplitude signals that may otherwise overscale between separate interrogations.

In general therefore embodiments relate to methods and apparatus for distributed fibre optic sensing, especially DAS, that use a local oscillator technique. Using at least first and second interrogation pulses and introducing a high frequency (hundreds of MHz) shift between interrogating pulses and the local oscillator means that there will be a scatter signal at a detectable carrier frequency from each pulse, when the backscatter is mixed with the local oscillator.

The frequency difference between each interrogation pulse is large enough (e.g. 100 MHz or so) that the scatter from each pulse interfering with the local oscillator signal LO can be demodulated and filtered to obtain a scatter-trace of the sensing fibre for each interrogation pulse independently. As the scatter-trace from each pulse can be demodulated separately, they can overlap in time, to allow for time-delayed measurements of the fibre scatter pattern at an arbitrary time delay between pulses.

A difference in phase can be measured from the first interrogation pulse compared to that measured for the same location from the second interrogation pulse after the arbitrary time delay, which may be relatively long compared to the duration of an interrogation pulse, but shorter than the interrogation period (during which a large signal may overscale). This temporal phase difference measurement can be integrated to recover a large amplitude phase signal, which would have over-scaled for each of the individual pulse measurements at the longer time interval of a whole interrogation period.

The interference of the backscatter from an interrogation pulse with the local oscillator signal LO causes a carrier signal to be generated on the detector at very high frequency e.g. 350 MHz, which is sampled on a fast ADC (e.g. 1 GHz). Each carrier signal is mixed down to baseband and low-pass filtered to remove DC noise and other carrier signals. This does require high-frequency AOMs and fast ADCs, however AOMs with modulation frequencies of around 350 MHz or greater are now becoming available and can be used satisfactorily. High speed, e.g. 1 GHz ADCs are also commercially available. In this way there is enough bandwidth around a carrier to represent high spatial resolution, e.g. a 1 m spatial resolution.

The angle of the complex baseband phasor (that results from the multiplying-down of the carrier signal on the detector) can be determined to get an absolute phase measurement of the total phase difference between the local oscillator to a location on the fibre and back again. To determine how the phase signal varies with location, the absolute phase may be spatially differentiated over a gauge length, which can be arbitrary and is performed numerically on the data. For a given polarisation channel, using the two different spatial-phase differential measurements, one from each carrier (each pulse), the temporal difference can be calculated by subtracting the spatial phase difference signals for a location measured separately by the scatter demodulated from each pulse. This signal may then integrated and scaled to recover a non-overscaled signal. This scaling factor and maximum signal amplitude that can be measured is a function of the time-delay between the optical pulses launched at each carrier frequency.

Embodiments thus provide a distributed fibre optic sensing system that can be used to provide quantitative outputs over a relatively long sensing range, e.g. up to or beyond 30 km. Embodiments may be used in a range of different applications where such quantitative output signals would be useful.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A distributed fibre optic sensing apparatus, comprising:
    an optical source;
    a local oscillator path configured to generate a local oscillator signal from the optical source;
    an optical modulator configured to, in use, modulate radiation from the optical source to provide a first interrogation pulse at a first frequency and a second interrogation pulse at a second, different, frequency in each of a plurality of repeated interrogation periods, where each of the first and second frequencies is different to the frequency of the local oscillator signal;
    a mixer configured to receive a backscatter signal comprising radiation from the first and second interrogation pulses which is backscattered from within a sensing optical fibre and to mix the backscatter signal with the local oscillator signal to provide a first mixed signal;
    a detector arrangement configured to receive the first mixed signal and provide a corresponding first digital signal;
    a processor configured to process the first digital signal, wherein the processor is configured to:
    process the first digital signal in a first processing channel to demodulate a first phase signal based on a first carrier frequency corresponding to the frequency difference between the first frequency and the frequency of the local oscillator signal;
    process the first digital signal in a second processing channel to demodulate a second phase signal based on a second carrier frequency corresponding to the frequency difference between the second frequency and the frequency of the local oscillator signal; and
    determine a temporal difference between the first phase signal and the second phase signal.

2. A distributed fibre optic sensing apparatus as claimed in claim 1 wherein the frequency difference between the first frequency and the second frequency is at least 80 MHz.

3. A distributed fibre optic sensing apparatus as claimed in claim 2 wherein the frequency difference between the first frequency and the second frequency is at least 100 MHz.

4. A distributed fibre optic sensing apparatus as claimed in claim 3 wherein the first launch frequency and the second launch frequency each differ from the frequency of the local oscillator signal by a frequency difference in the range 200 MHz to 400 MHz.

5. A distributed fibre optic sensing apparatus as claimed in claim 1 wherein the first frequency and the second frequency each differ from the frequency of the local oscillator signal by at least 200 MHz.

6. A distributed fibre optic sensing apparatus as claimed in claim 1 wherein the first and second phase signals each comprise spatial-differential phase signals indicative of a differential change in phase over a defined gauge length of the sensing optical fibre at each of a plurality of locations along the sensing optical fibre as determined from the first and second interrogation pulses respectively.

7. A distributed fibre optic sensing apparatus as claimed in claim 1 wherein the processor is further configured to integrate the determined temporal difference between the first phase signal and the second phase signal over time with a scaling factor based on the time delay between the first and second interrogation pulses as a fraction of the interrogation period to provide a scaled phase signal.

8. A distributed fibre optic sensing apparatus as claimed in claim 7 wherein the processor is further configured to output a measurement signal based on the scaled phase signal.

9. A distributed fibre optic sensing apparatus as claimed in claim 1 wherein the processor is configured such that the processing of the first digital signal comprises:
    down-converting and subsequently low-pass filtering a version of the first digital signal based on the first carrier frequency to provide a first baseband signal in the first processing channel; and
    down-converting and subsequently low-pass filtering a version of the first digital signal based on the second carrier frequency to provide a second baseband signal in the second processing channel.

10. A distributed fibre optic sensing apparatus as claimed in claim 9 wherein the processor is configured such that the low-pass filtering has a cut-off frequency of 40 MHz or higher.

11. A distributed fibre optic sensing apparatus as claimed in claim 9 wherein the detector arrangement is configured such that the first digital signal has a sample rate which is at least twice the frequency of the highest of the first carrier frequency and the second carrier frequency and the processor is configured to process the first and second baseband signals in the respective first and second processing channels to reduce the sample rate.

12. A distributed fibre optic sensing apparatus as claimed in claim 11 wherein processing the first and second baseband signals further comprises summing each of the first and second baseband signals over a distance corresponding to half a length of the first and second interrogation pulses in the sensing optical fibre.

13. A distributed fibre optic sensing apparatus as claimed in claim 9 wherein the processor is configured such that the processing of the first digital signal comprises, for each of the first and second processing channels, determining a value of phase angle of a phasor of the respective first or second baseband signal for each of a plurality of locations along the sensing optical fibre.

14. A distributed fibre optic sensing apparatus as claimed in claim 13 wherein the processor is configured such that the processing of the first digital signal comprises, for each of the first and second processing channels, generating the respective first or second phase signals by determining a differential change in said phase angle over a defined gauge length of the sensing optical fibre at each of a plurality of locations along the sensing optical fibre.

15. A distributed fibre optic sensing apparatus as claimed in claim 1 wherein:
the mixer is further configured to mix the backscatter signal with the local oscillator signal in a different polarisation state to provide a second mixed signal;
the detector arrangement is also configured to receive the second mixed signal and provide a corresponding second digital signal; and
the processor is configured to process the second digital signal in the same way as the first digital signal.

16. A distributed fibre optic sensing apparatus as claimed in claim 15 wherein the processor is configured to combine data generated from processing the first digital signal and data generated from processing the first digital signal according to a quality metric.

17. A distributed fibre optic sensing apparatus according to claim 1 wherein the optical modulator comprises an acousto-optic modulator.

18. A distributed fibre optic sensing apparatus according to claim 1 further comprising a sensing optical fibre coupled to receive the interrogating pulses from the optical modulator and to provide the backscatter signal to the mixer.

19. A method of distributed fibre optic sensing comprising:
generating a local oscillator signal;
repeatedly interrogating a sensing optical fibre with optical radiation, wherein each interrogation comprises, over an interrogation period, launching a first interrogation pulse at a first frequency and a second interrogation pulse at a second, different, frequency into the sensing optical fibre, wherein the each of the first and second frequencies is different to the frequency of the local oscillator signal;
receiving a backscatter signal from the sensing optical fibre;
mixing the backscatter signal with the local oscillator signal to provide a first mixed signal;
generating a first digital signal corresponding to the first mixed signal;
processing the first digital signal in a first processing channel to demodulate a first phase signal based on a first carrier frequency corresponding to the frequency difference between the first frequency and the frequency of the local oscillator signal;
processing the first digital signal in a second processing channel to demodulate a second phase signal based on a second carrier frequency corresponding to the frequency difference between the second frequency and the frequency of the local oscillator signal; and
determining a temporal difference between the first phase signal and the second phase signal.

\* \* \* \* \*